United States Patent
Grayson et al.

(10) Patent No.: US 9,282,465 B2
(45) Date of Patent: Mar. 8, 2016

(54) MULTI-OPERATOR CORE NETWORK SHARED SMALL CELL DEPLOYMENT IN A NON-MULTI-OPERATOR MACRO NETWORK ENVIRONMENT

(71) Applicant: CISCO TECHNOLOGY, INC., San Jose, CA (US)

(72) Inventors: Mark Grayson, Maidenhead (GB); Hendrikus G. P. Bosch, Aalsmeer (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/305,431

(22) Filed: Jun. 16, 2014

(65) Prior Publication Data

US 2015/0365829 A1 Dec. 17, 2015

(51) Int. Cl.
- *H04W 16/14* (2009.01)
- *H04W 48/16* (2009.01)
- *H04W 36/00* (2009.01)
- *H04W 72/04* (2009.01)
- *H04W 88/08* (2009.01)

(52) U.S. Cl.
CPC .......... *H04W 16/14* (2013.01); *H04W 36/0083* (2013.01); *H04W 48/16* (2013.01); *H04W 72/0426* (2013.01); *H04W 88/08* (2013.01)

(58) Field of Classification Search
USPC .................. 455/454, 436, 406, 442
See application file for complete search history.

(56) References Cited

U.S. PATENT DOCUMENTS

| | | | |
|---|---|---|---|
| 6,464,743 B2 | 10/2002 | Kanno et al. | |
| 7,330,452 B2 | 2/2008 | Shiu et al. | |
| 7,768,983 B2 | 8/2010 | Nylander et al. | |
| 8,019,331 B2 | 9/2011 | Khetawat et al. | |
| 8,059,584 B2 | 11/2011 | Shiu et al. | |
| 8,228,861 B1 | 7/2012 | Nix | |
| 8,644,193 B2 | 2/2014 | Schein et al. | |
| 2006/0183502 A1* | 8/2006 | Jeong et al. | 455/560 |
| 2008/0305768 A1 | 12/2008 | Nylander et al. | |

(Continued)

FOREIGN PATENT DOCUMENTS

| | | |
|---|---|---|
| EP | 2863680 | 4/2015 |
| WO | WO2013/064419 | 5/2013 |

OTHER PUBLICATIONS

EPO Mar. 25, 2015 Extended Search Report and Written Opinion from European Application 14183969.6.

(Continued)

*Primary Examiner* — Nathan Taylor
(74) *Attorney, Agent, or Firm* — Patent Capital Group

(57) ABSTRACT

A method provided in one embodiment includes receiving a resource list including a first core network identifier identifying a first core network, at least a first resource identifier identifying a first subset of network resources from a plurality of network resources associated with the first core network, and a first priority value associated with each of the identified resources of the first core network. The method further includes receiving a first device identifier associated with a first user equipment, determining whether a portion of the first device identifier matches the first core network identifier, and modifying the resource list to include at least a second resource identifier identifying a second subset of the network resources from the plurality of network resources associated with the first core network when the portion of the first device identifier is determined to match the first core network identifier.

25 Claims, 12 Drawing Sheets

(56) References Cited

U.S. PATENT DOCUMENTS

| | | | |
|---|---|---|---|
| 2009/0325577 A1* | 12/2009 | Furtenback et al. | 455/436 |
| 2011/0128890 A1 | 6/2011 | Schein et al. | |
| 2011/0130144 A1* | 6/2011 | Schein et al. | 455/442 |
| 2011/0235546 A1 | 9/2011 | Horn et al. | |
| 2012/0030373 A1* | 2/2012 | Yang | 709/244 |
| 2012/0094665 A1 | 4/2012 | Soliman et al. | |
| 2012/0264443 A1 | 10/2012 | Ng et al. | |
| 2013/0089073 A1 | 4/2013 | Zhu | |
| 2013/0267229 A1* | 10/2013 | Gopalakrishnan | 455/436 |
| 2013/0303114 A1* | 11/2013 | Ahmad et al. | 455/406 |

OTHER PUBLICATIONS

Qualcomm Incorporated: "Support of Inter PLMN Handover to CSG Cells," 3GPP Draft R2-114406, WG2 Meeting #75, Athens, Greece, Aug. 22-26, 2011; 6 pages.

"3GPP TS-23.251 V10.1.0 (Mar. 2011) Technical Specification: $3^{rd}$ Generation Partnership Project; Technical Specification Group Services and System Aspects; Network Sharing; Architecture and functional description (Release 10)," $3^{rd}$ Generation Partnership Project, Mar. 2011, 25 pages.

3GPP TR-25.875 V5.0.0 (Mar. 2002) Technical Report: $3^{rd}$ Generation Partnship Project; Technical Specification Group Radio Access Network; Non Access Stratum (NAS) Node Selection Function (Release 5), $3^{rd}$ Generation Partnership Project, Mar. 2002, 12 pages.

"3GPP-TR-37.803 V11.2.0 (Jun. 2013) Technical Report: $3^{rd}$ Generation Partnership Project; Technical Specification Group Radio Access Network; Universal Mobile Telecommunications System (UMTS) and LTE; Mobility Enhancements for Home Node B (HNB) aand Home enhanced Node B (HeNB) (Release 11)," $3^{rd}$ Generation Partnership Project, Mar. 2013, 116 pages.

U.S. Appl. No. 14/310,915, filed Jun. 20, 2014, entitled "Handling Connected Mode Mobility from areas bounding multi-operator core network and non-multi-operator core network shared infrastructure," Inventors: Santosh Patil et al.

USPTO Dec. 30, 2015 Non-Final Office Action from U.S. Appl. No. 14/310,915.

* cited by examiner

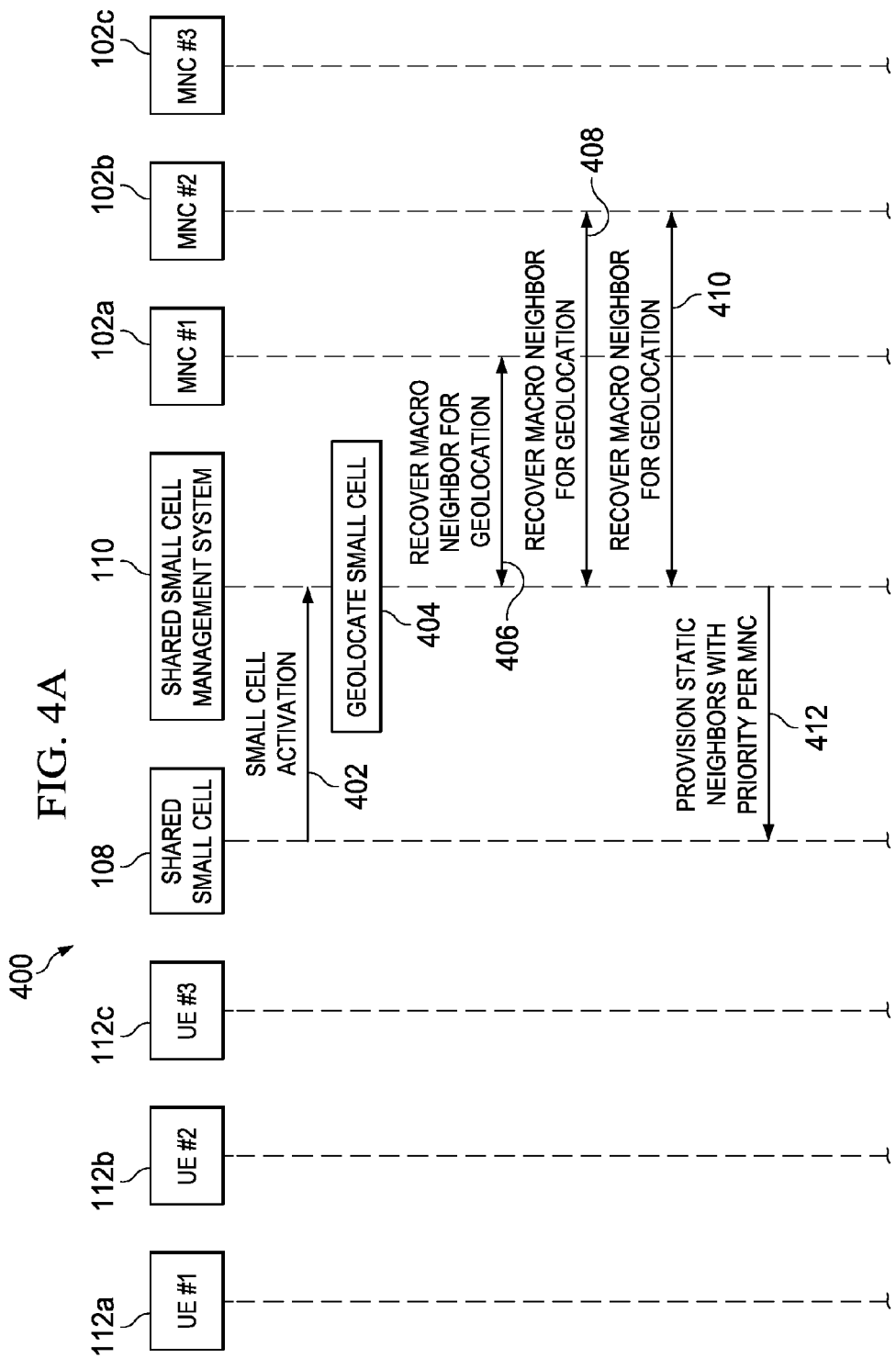

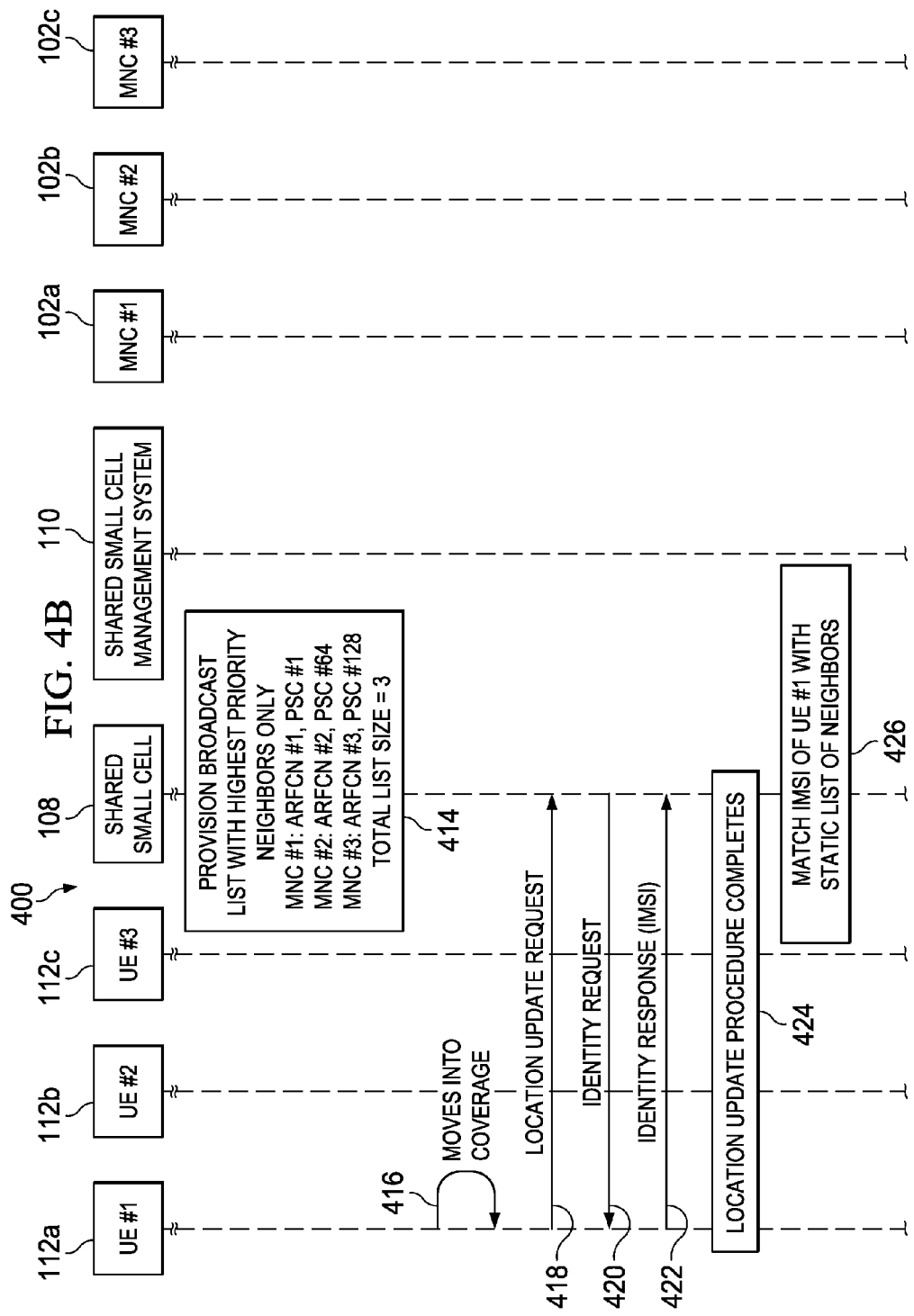

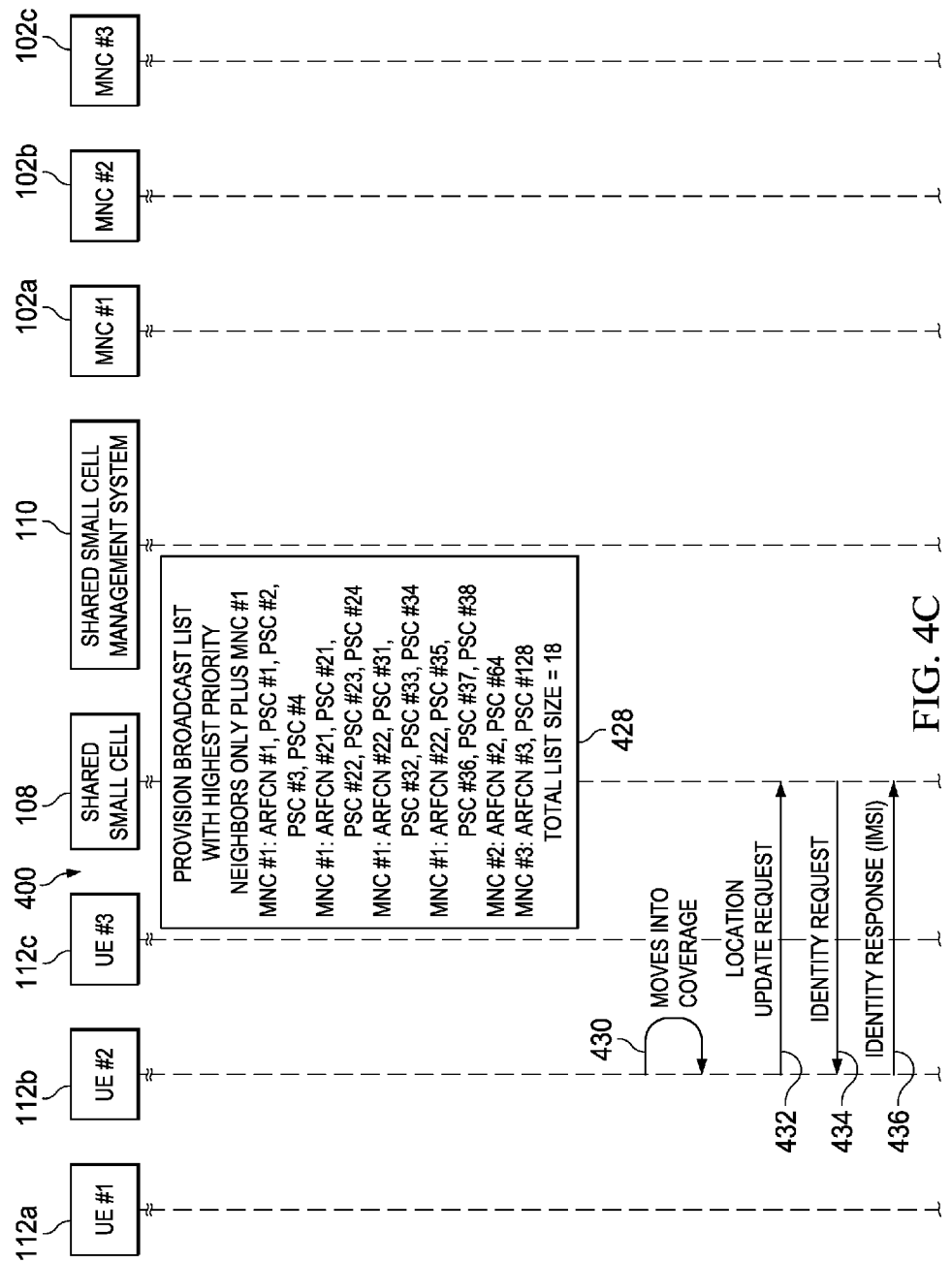

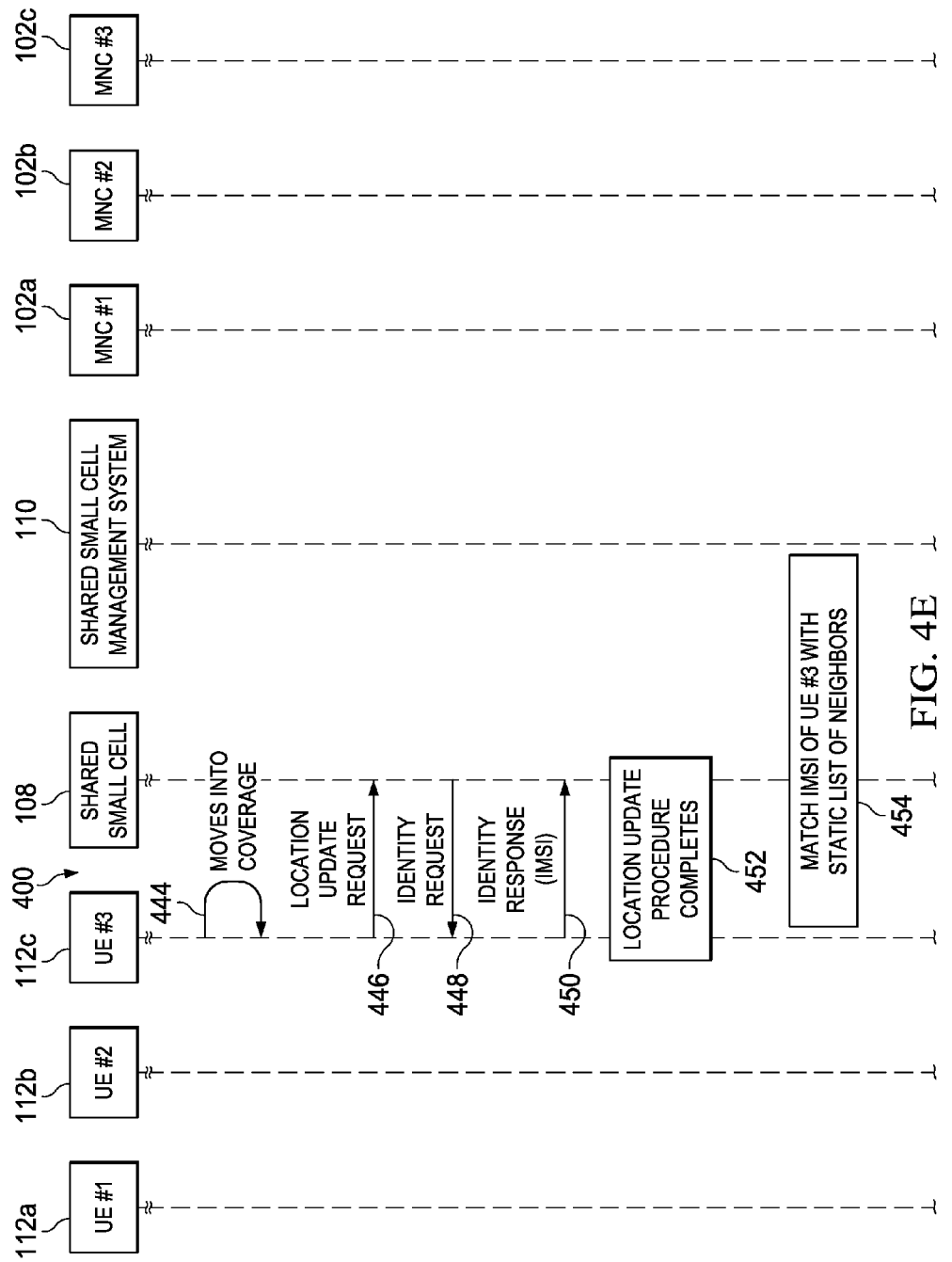

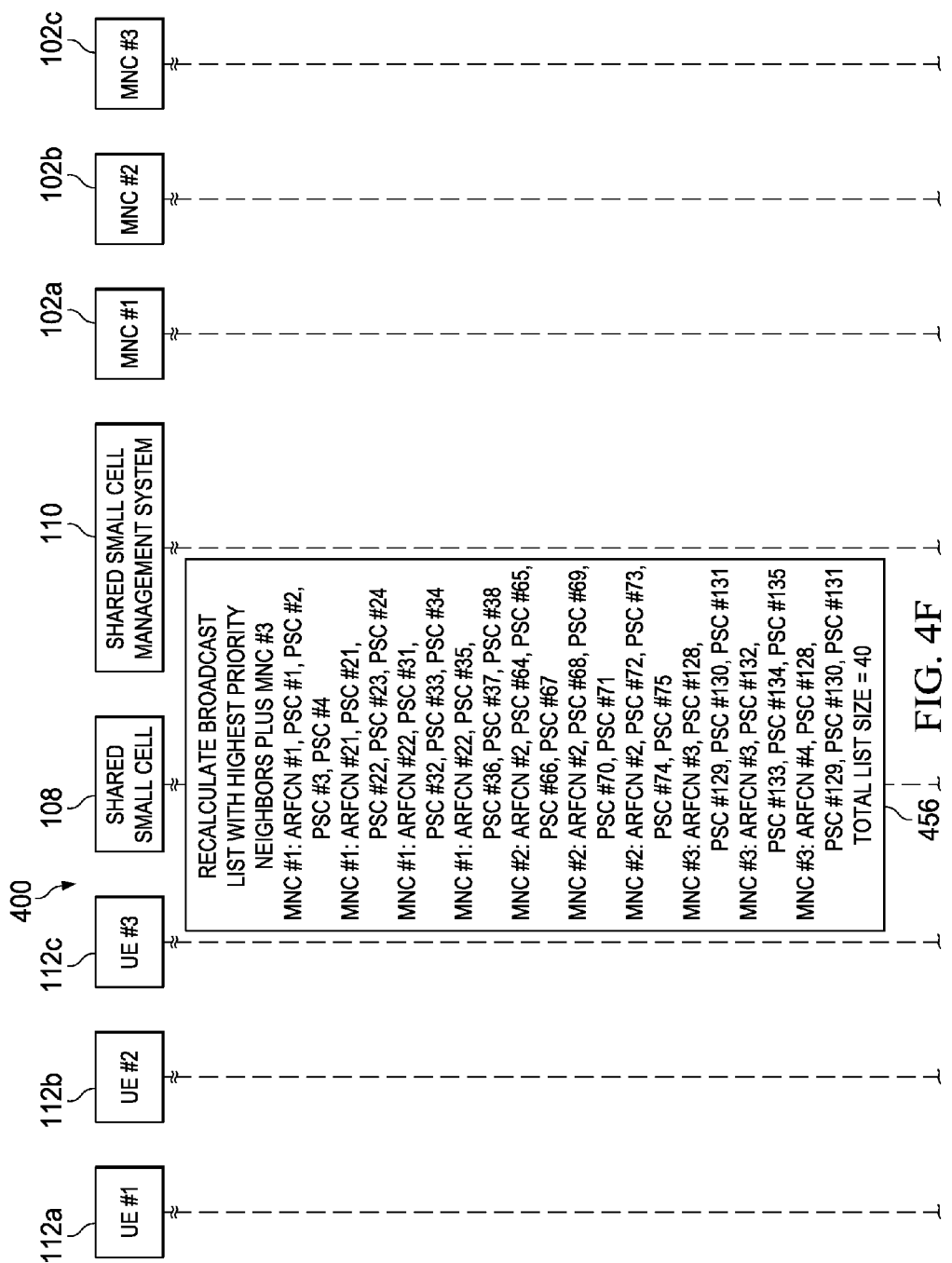

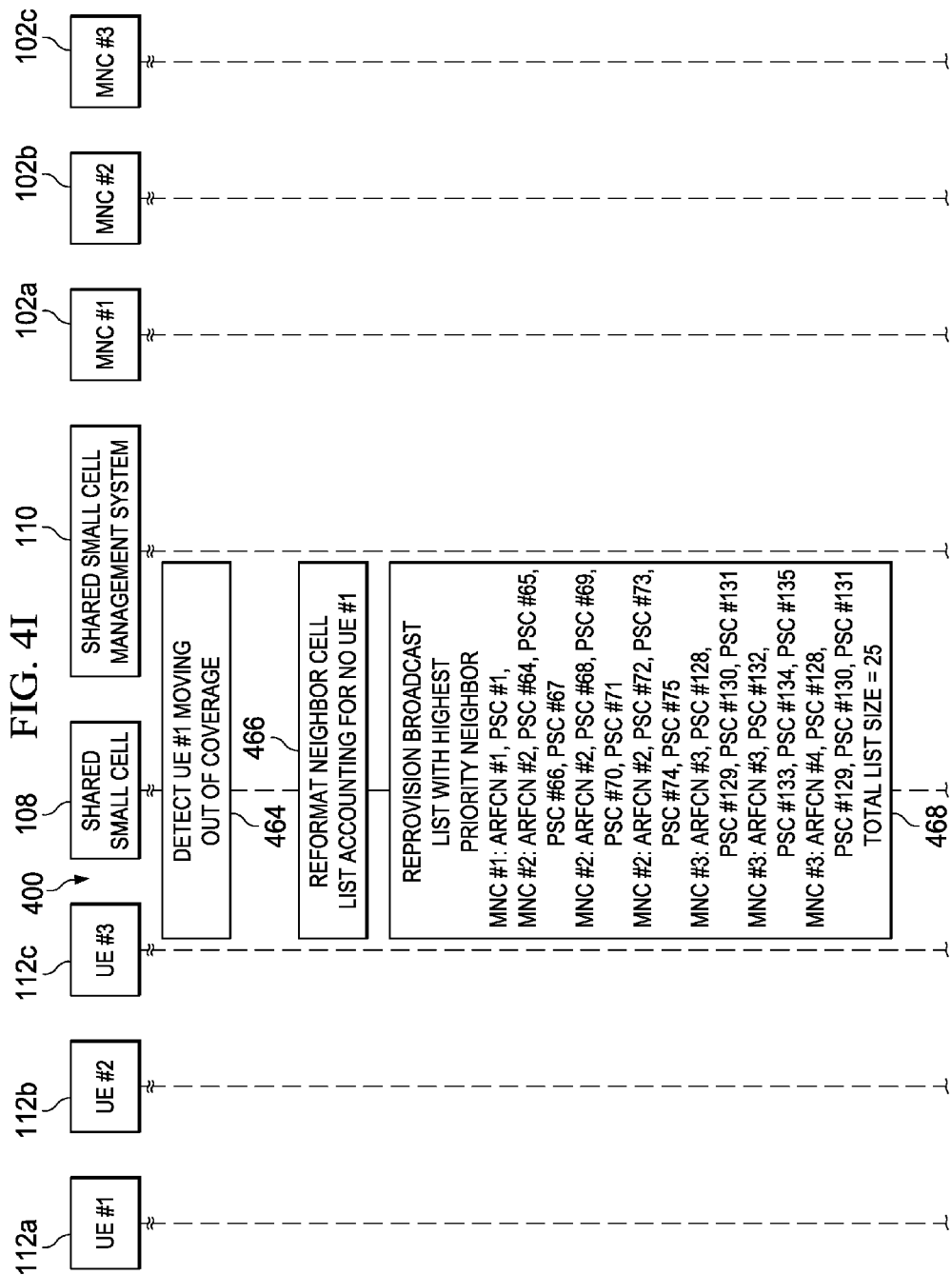

MULTI-OPERATOR CORE NETWORK SHARED SMALL CELL DEPLOYMENT IN A NON-MULTI-OPERATOR MACRO NETWORK ENVIRONMENT

TECHNICAL FIELD

This disclosure relates in general to the field of communications and, more particularly, to multi-operator network shared small cell deployment in a non-multi-operator macro network environment.

BACKGROUND

Networking architectures have grown increasingly complex in communication environments. For example, femtocells have gained recent notoriety due to their capabilities, and because of their ease-of-use. In general terms, access points can operate in licensed spectrum to connect wireless devices to the network (e.g., using broadband connections). For a mobile operator, the access points can offer improvements to both coverage and capacity: particularly applicable to indoor environments. An increasing emphasis exists on deploying small cell access points within such environments. The owner or manager of these environments may mandate that multiple operators share the small cell access point in a particular environment. Existing standards are based on the assumption that the multiple operators may share radio access network (RAN) resources as well as the small cell access point. However, one or more network operators may not wish to share RAN resources.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 4A-4I are a simplified flow diagram depicting a flow associated with multi-operator network shared small cell deployment in a non-multi-operator macro network environment.

DETAILED DESCRIPTION OF EXAMPLE EMBODIMENTS

Overview

Figure 1:
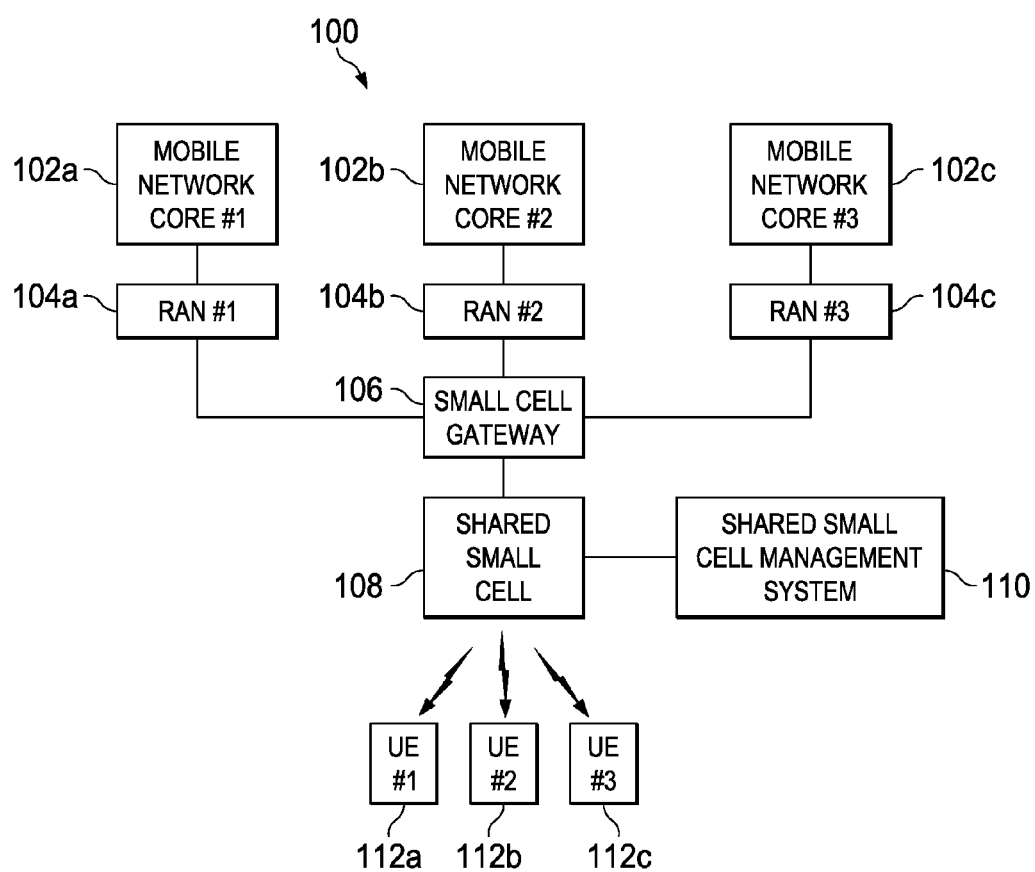
FIG. 1 is a simplified block diagram of a communication system for performing multiple operator network shared small cell deployment in a non-multiple operator macro network environment in accordance with one embodiment of the present disclosure.

A method is provided in one embodiment and includes receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network. The method further includes receiving a first device identifier associated with a first user equipment, determining whether a portion of the first device identifier matches the first core network identifier, and modifying the resource list to include at least a second resource identifier identifying a second subset of the network resources from the plurality of network resources associated with the first core network when the portion of the first device identifier is determined to match the first core network identifier.

In specific embodiments, the method further includes determining whether a size of the resource list is greater than a predetermined value, and removing at least one of the second resource identifiers having a lowest first priority value from among the remaining resource identifiers when the size of the resource list is greater than the predetermined value. In other specific embodiments, the method further includes determining whether the first user equipment has moved out of coverage of the first network element, and removing a portion of the second resource identifiers identifying the second subset from the resource list when the first user equipment is determined to have moved out of coverage of the first network element. In other specific embodiments, the method further includes broadcasting the resource list to the first user equipment. In specific embodiments, the first user equipment is associated with the first core network.

In specific embodiments, the resource list further includes a second core network identifier identifying a second core network, at least a second resource identifier identifying a third subset of network resources from a plurality of network resources associated with the second core network, and a second priority value associated with each of the identified resources of the second core network. In other specific embodiments, the method includes receiving a second device identifier associated with a second user equipment, determining whether a portion of the second device identifier matches the second core network identifier, and modifying the resource list to include at least a third resource identifier identifying a fourth subset of the network resources from the plurality of network resources associated with the second core network when the portion of the second device identifier is determined to match the second core network identifier.

In specific embodiments, the second user equipment is associated with the second core network. In other specific embodiments, the resource list is an inter-frequency neighbor list. In other specific embodiments, the first core network identifier includes a mobile country code (MCC)/mobile network code (MNC). In other specific embodiments, the plurality of network resources associated with the first core network includes one or more of an absolute radio-frequency channel number (ARFCN) and a primary scrambling code (PSC). In other specific embodiments, the first device identifier includes an international mobile subscriber identity (IMSI) associated with the first user equipment. In other specific embodiments, the first subset of network resources is greater than the second subset of network resources. In other specific embodiments, the first network element includes a small cell access point.

Logic encoded in one or more non-transitory media is provided in one embodiment that includes code for execution and when executed by a processor operable to perform operations comprising receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network. The processor operations further include receiving a first device identifier associated with a first user equipment, determining whether a portion of the first device identifier matches the first core network identifier, and modifying the resource list to include at least a second resource identifier identifying a second subset of the network resources from the plurality of network resources associated with the first core network when the portion of the first device identifier is determined to match the first core network identifier.

A network element is provided in one embodiment and includes a memory element configured to store electronic code, a processor operable to execute instructions associated with the electronic code, and a module coupled to the memory element and the processor. The network element is configured for receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network. The network element is further configured for receiving a first device identifier associated with a first user equipment, determining whether a portion of the first device identifier matches the first core network identifier, and modifying the resource list to include at least a second resource identifier identifying a second subset of the network resources from the plurality of network resources associated with the first core network when the portion of the first device identifier is determined to match the first core network identifier.

Example Embodiments

Turning to FIG. 1, FIG. 1 is a simplified block diagram of a communication system 100 for performing multiple operator network shared small cell deployment in a non-multiple operator macro network environment in accordance with one embodiment of the present disclosure. Communication system 100 includes a first mobile network core 102a, a second mobile network core 102b, a third mobile network core 102c, a first radio access network (RAN) 104a, a second RAN 104b, a third RAN 104c, a small cell gateway 106, a shared small cell 108, a shared small cell management system 110, a first user equipment 112a, a second user equipment 112b, and a third user equipment 112c.

First mobile network core 102a, second mobile network core 102b, and third mobile network core 102c are each in communication with small cell gateway 106 via first RAN 104a, second RAN 104b, and third RAN 104c, respectively. Small cell gateway 106 is further in communication with shared small cell 108. Shared small cell management system 110 is in communication with shared small cell 108. Each of first user equipment (UE) 112a, second user equipment (UE) 112b, and third user equipment (UE) 112c are in wireless communication with shared small cell 108.

First mobile network core 102a, second mobile network core 102b, and third mobile network core 102c are each mobile core macro cell networks that are operated by a first operator, second operator, and third operator, respectively. In the particular embodiment illustrated in FIG. 1, the first operator, second operator, and third operator do not have an existing agreement to share RAN resources among one another. Accordingly, first mobile network core 102a has an associated first RAN 104a operated by the first operator, second mobile network core 102b has an associated second RAN 104n operated by the second operator, and third mobile network core 102b has an associated third RAN 104c operated by the third operator. Small cell gateway 106 functions as a gateway between the mobile network core (such as one or more of first mobile network core 102a, second mobile network core 102b, and third mobile network core 102c) and one or more small cells within a small cell environment. In the embodiment illustrated in FIG. 1, shared small cell 108 is shared by first mobile network core 102a, second mobile network core 102b, and third mobile network core 102c.

Shared small cell 108 further provides first UE 112a, second UE 112b, and third UE 112c with access to one or more of first mobile network core 102a, second mobile network core 102b, and third mobile network core 102c. In a particular embodiment, shared small cell 108 is a small cell access point located at or within a small cell environment such as a commercial building or other premises. In particular embodiments, shared small cell 108 is a femtocell access point. In still another particular embodiment, shared small cell is a Home Node B (HNB) femtocell providing 3G radio coverage within the small cell environment. Shared small cell management system 110 is configured to management various functions, services, and resources provided by shared small cell 108.

Each of user equipment 112a-112c is configured to include a cellular radio capable of communicating with small cell access points located within a small cell environment as well as macro cells located within an service provider network. Each of user equipment 112a-112c can be associated with clients or customers wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

Each of user equipment 102a-102c may also be inclusive of a suitable interface to the human user, such as a microphone, a display, a keyboard, or other terminal equipment. Each of user equipment 112a-112c may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

Note that before detailing some of the operational aspects of FIG. 1, it is important to understand common characteristics of radio access points, femtocells, etc. as they generally operate in commercial architectures. The following foundational information is offered earnestly for purposes of teaching and example only and, therefore, should not be construed in any way to limit the broad teachings of the present disclosure. In many system architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Femtocells are fully featured (but low-power) wireless device base stations. Femtocells can be connected using standard broadband digital subscriber line (DSL), cable service, or Enterprise Network into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

Multi-Operator Core Network (MOCN) allows network operators to share equipment and other resources, in particular RAN equipment and resources, in a particular geographic service area. 3GPP standards have defined shared Node B(NB)/eNode B (ENB)/Home Node B (HNB)/Home eNode B (HeNB)/capabilities on the presumption that the cells surrounding a MOCN enabled base station are also shared. Typically, MOCN deployments therefore see networks partitioned on a geographic basis with one operator responsible for deploying MOCN enabled macro networks in one area and a second operator deploying MOCN enabled macro networks in another geographic area. Furthermore, 3GPP requires all cells in a tracking area (TA)/routing area (RA)/location area (LA) to conform to the same MOCN status, i.e., a single cell cannot be MOCN enabled if the neighboring cells in the TA/RA/LA are not similarly shared.

Recent moves to adopt small cells is causing the assumptions of the 3GPP approach above to breakdown. Now, venue owners may mandate shared small cell infrastructure by the operators (much the same as distributed antenna systems (DAS) are shared) without an appreciation that the macro network is not shared between the operators. Various embodiments described herein relate to optimally supporting MOCN small cells in geographies in which the macro network is not MOCN enabled.

Referring again to FIG. 1, a MOCN small cell (such as a HNB) system is defined that is able to be integrated in a geography in which the available core network that share the small cell have not entered into a broader MOCN arrangement for their macro networks. In particular, shared small cell 108 may be MOCN enabled that is deployed by a core network operator associated with first mobile network core 102a. However, because of restrictions placed on the deployment by the owner/manager of the premises in which shared small cell 108 is deployed, shared small cell 108 may be required to offer shared service to two independent core network operators including a second core network operator associated with second mobile network core 102b and a third core network operator associated with third mobile network core 102c.

Accordingly, MOCN enabled shared small cell 106 must arbitrate resources between the three core network operators. In one particular embodiment, the resources refer to the common channels shared by all user equipment in the cell. Existing solutions enable the small cell to broadcast the available core networks to attached UEs that then enable those UEs of different core networks operators to have access via the shared small cell. Various embodiments described herein relate to the arbitration and configuration of resources corresponding to the system information that is broadcast from shared small cell 108 by enabling optimum configuration of broadcast system information.

In particular embodiments, the inter-frequency neighbor cell list is broadcast by shared small cell 108 to assist in cell reselection procedures by one or more of UEs 112a-112c. The deployment of the MOCN shared small cell 108 in a non-MOCN macro environment places the additional requirements of being able to support reselection from the MOCN-enabled small cell 108 to first macro RAN 104a of first mobile network core 102a, second macro RAN 104b of second mobile network core 102b and third macro RAN 104a of third mobile network core 102c. Considering these macro networks are deployed in the same geographical area, independent frequency allocations will be allocated to the different CN operators.

In a particular example, consider shared small cell 106 operating on a frequency F1, first mobile network core 102a operating first macro RAN 104a on a frequency F2 and a frequency F3, second mobile network core 102b operating second macro RAN 104b on a frequency F4 and a frequency F5, and third mobile network operating 102c operating third macro RAN 104c on a frequency F6 and a frequency F7. The inter-frequency neighbor list includes a list of frequencies used by neighboring base stations. The inter-frequency neighbor list is a constrained resource and can only support a limited number of entries, e.g., in 3G it is limited to 32 frequencies. Considering a simplified hexagonal macro network, each frequency F2-F7 may have 7 cells that are neighboring to shared small cell 108, meaning a total of 42 inter-frequency neighbors for the MOCN enabled shared small cell 108. With only 32 entries, an intelligent approach is required to optimally populate the inter-frequency neighbor list.

In particular, the MOCN architecture includes a Non Access Stratum (NAS) Node Selection Function to assign specific network resources to serve a particular UE and subsequently route the traffic to the assigned network resource. The NAS Node Selection function is able to determine the mobile country code (MCC)/mobile network code (MNC) used to identify a particular core network from an international mobile subscriber identity (IMSI) to then determine how to route UE initiated mobility management and/or connection management dialogues. The NAS Node Selection Function is described, for example, in 3GPP TS 23.251. Whereas a 3G HNB does not include NAS Node Selection Function capability, the HNB will typically perform a mobility management (MM) identity (ID) request for those UEs that it is initially in communications with. In this way the HNB is able to recover the MCC/MNC of the attached UEs via the MM ID response.

In particular embodiments, shared small cell 108 is configured using a management object such as described in Broadband Forum (BBF) Technical Report TR-196v2. The management object enables the network to configure static neighbors to be broadcast in the system information. In accordance with various embodiments, a management object (such as a TR-196v2 management object) is enhanced in one or more of the following distinct ways:

i) the static neighbor list is enhanced with capability to identify the MOCN core network (MCC/MNC) associated with a neighbor list;

ii) multiple neighbor lists are signaled for individual MOCN core network operators; and iii) static neighbor lists entries are associated with a priority value to enable conflicts to be resolved.

The enhanced MOCN enabled shared small cell 108 is then configured to use the recovered MM identity (IMSI) of attached UEs together with the enhanced static neighbor cell lists to construct the optimum inter-frequency neighbor list to be broadcast from shared small cell 108. The inter-frequency neighbor list is then broadcast by shared small cell 108 to one or more of UEs 112a-112c. In one or more embodiments, the inter-frequency neighbor list is broadcast within a System Information Broadcast message.

In further detail, those static neighbor entries corresponding to MCC/MNC values that are not currently associated with UEs attached to shared small cell 108 are preferentially not broadcast in the system information. For example, if UEs only associated with mobile network core 102c are attached to shared small cell 108, then the inter-frequency neighbor list will include those entries corresponding to F6/F7. If a new UE associated with mobile network core 102a attaches to shared small cell 108, shared small cell 108 is configured to reconfigure its inter-frequency neighbor list to broadcast F2/F3/F6/F7 as reselection candidates. Shared small cell 108 is configured to detect when UEs leave coverage of the MOCN enabled shared small cell 108. After the last UE associated with a particular core network operator leaves coverage, the intra-frequency neighbor lists associated with that core network are removed from the broadcast information.

There may exist cases in which because of the number of core networks associated with UEs attached to MOCN enabled shared small cell 108, that the list of static inter-frequency neighbors exceeds the broadcast list limitation. In such cases, shared small cell 108 may be configured to use the signaled priority information to remove lower priority inter-frequency neighbors from its list until the list is of a size that meets the broadcast list limitation and is thus able to be broadcast by shared small cell 108 to one or more of UEs 112a-112c.

Although various embodiments described herein relate to the broadcast of inter-frequency system information by shared small cell 108 in which the macro network is not necessarily shared, it should be understood that the principles described herein may be applied to other constrained resources within the shared small cell network such as other broadcast system information or HNB configuration information.

Figure 2:
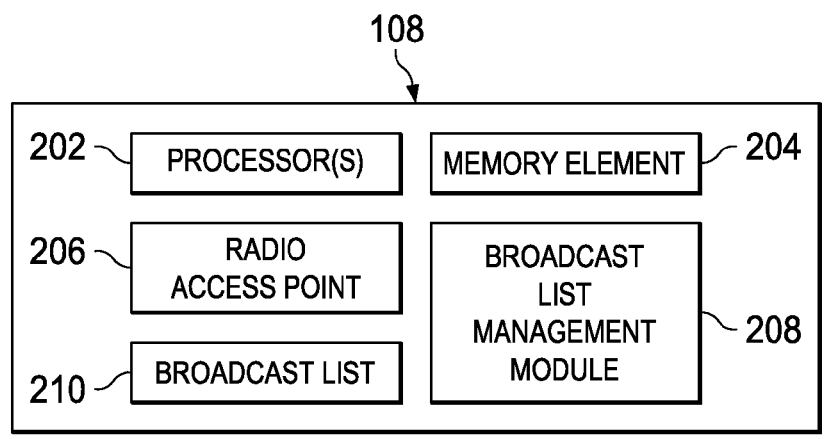
FIG. 2 is a simplified block diagram of a shared small cell in accordance with one embodiment.

Referring now to FIG. 2, FIG. 2 is a simplified block diagram of shared small cell 108 in accordance with one embodiment. Shared small cell 108 includes a processor 202, a memory element 204, a radio access point 206, a broadcast list management module 208, and a broadcast list storage 210. Processor 202a is configured to execute various tasks of shared small cell 202 as described herein and memory element 204 is configured to store data associated with shared small cell 108. Radio access point 206 is configured to communicate using a wireless radio connection, such as a 3G or 4G connection, with one or more of UEs 112a-112c. Broadcast list management module 208 is configured to perform the various broadcast list management functions of shared small cell AP 108 as described herein. Broadcast list storage 210 is configured to store a broadcast list associated with shared small cell 108. In a particular embodiment, the broadcast list includes an inter-frequency neighbor list.

Figure 3:
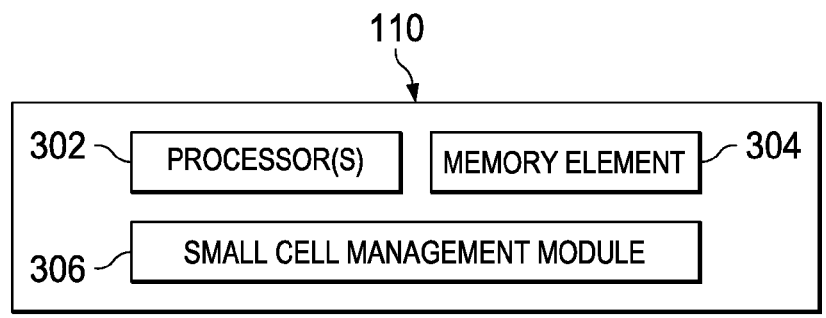
FIG. 3 is a simplified block diagram of shared small cell management system in accordance with one embodiment.
Figure 4D:
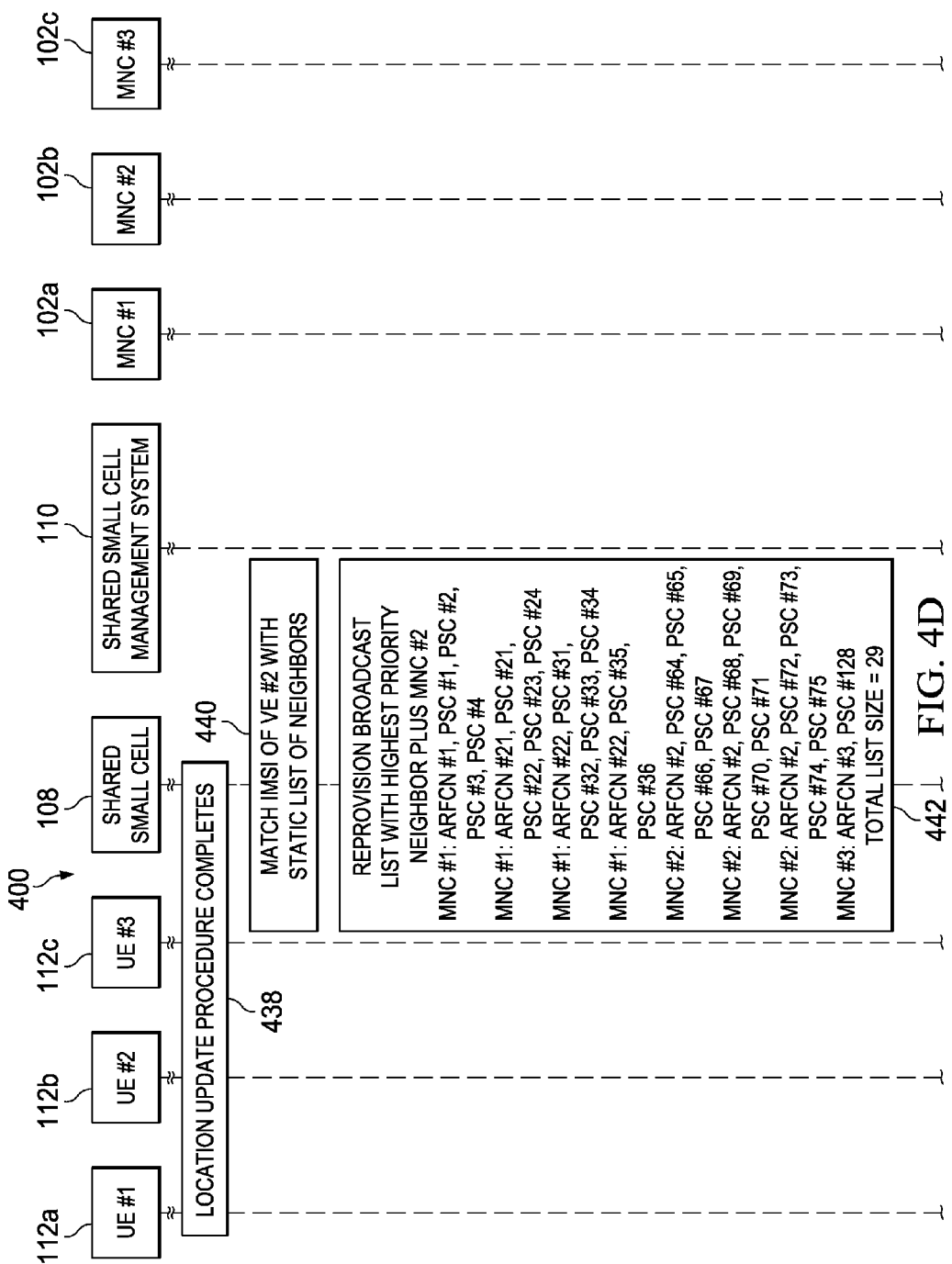
Figure 4G:
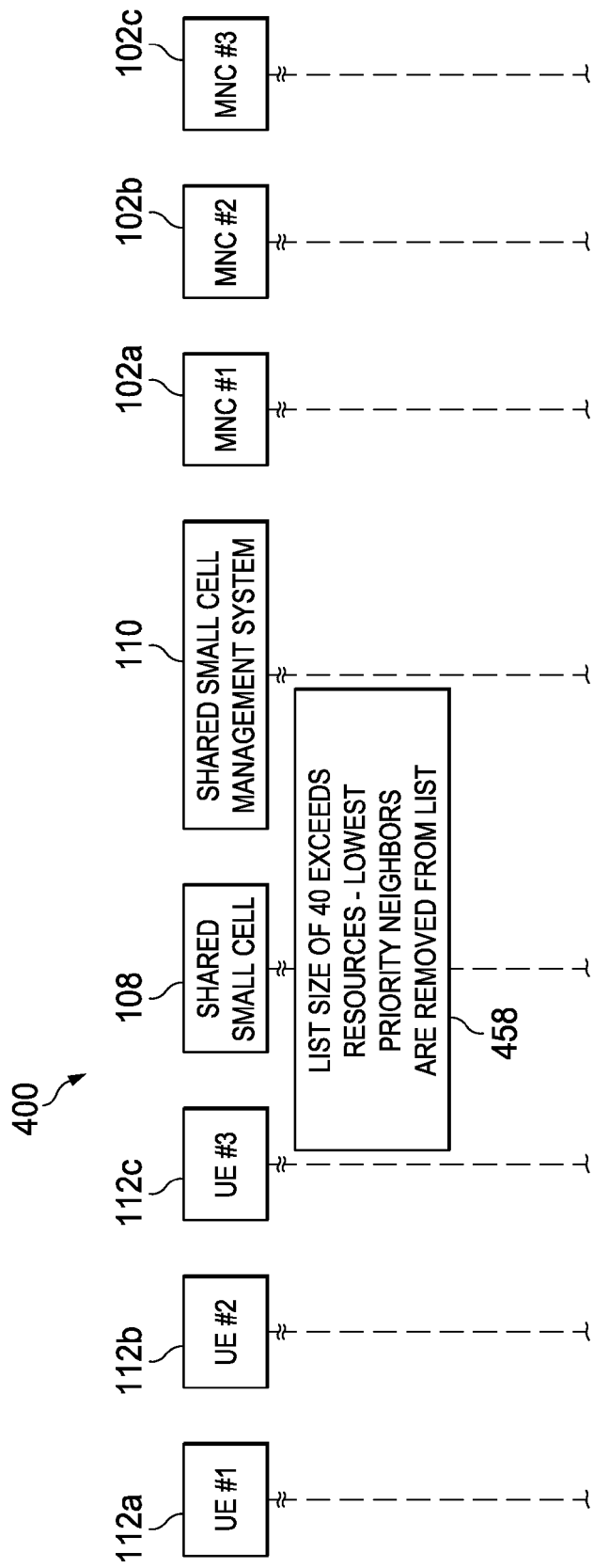
Figure 4H:
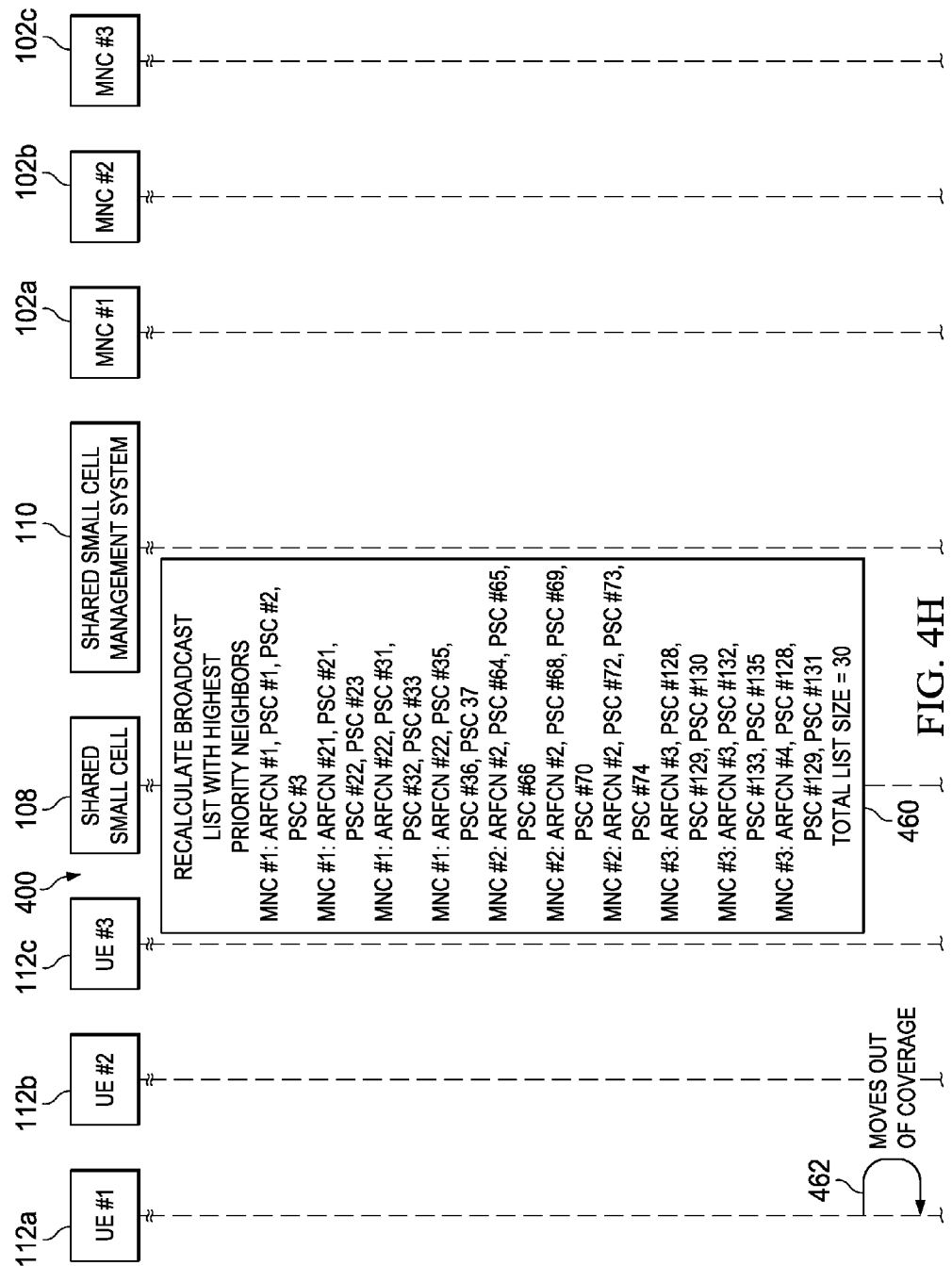

Referring now to FIG. 3, FIG. 3 is a simplified block diagram of shared small cell management system 110 in accordance with one embodiment. Shared small cell management system 110 includes a processor 302, a memory element 204, and a small cell management module 306. Processor 302 is configured to execute various tasks of shared small cell management system as described herein and memory element 304 is configured to store data associated with shared small cell management system 110. Small cell management module 306 is configured to perform various small cell management functions of shared small cell management system 110 as described herein.

In one example implementation, small cell gateway 106, shared small cell 108 and/or shared small cell management system 110 are network elements that facilitate or otherwise help coordinate multiple operator network shared small cell activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, small cell gateway 106, shared small cell 108 and/or shared small cell management system 110 include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Referring now to FIGS. 4A-4I, FIGS. 4A-4IF4 are a simplified flow diagram depicting a flow 400 associated with multi-operator network shared small cell deployment in a non-multi-operator macro network environment. In this particular flow 400, first MNC (MNC #1) 102a, second MNC (MNC #2) 102b, and third MNC (MNC #3) 102c do not have an existing agreement to share RAN infrastructure. However, shared small cell 108 is shared among first MNC (MNC #1) 102a, second MNC (MNC #2) 102b, and third MNC (MNC #3) 102c. First UE (UE #1) 112a is associated with a subscriber of MNC #1 102a, second UE (UE #2) 112b associated with a subscriber of MNC #2 102b, and third UE (UE #3) 112c is associated with a subscriber of third MNC (MNC #3) 102c. First UE 112a, second UE 112b, and third UE 112c access their respective core networks via shared small cell 108.

In 402, shared small cell 108 sends a small cell activation message to shared small cell management system 110. In 404, shared small cell management system 110 performs a geolocation procedure to geolocate shared small cell 108. In 406, shared small cell management system 110 requests and receives the inter-frequency neighbor list for the macro network associated with first MNC (MNC #1) 102a for the identified geolocation. In 408, shared small cell management system 110 requests and receives the inter-frequency neighbor list for the macro network associated with second MNC (MNC #2) 102b for the identified geolocation. In 410, shared small cell management system 110 requests and receives the inter-frequency neighbor list for the macro network associated with third MNC (MNC #3) 102*c* for the identified geolocation. In one or more particular embodiments, the inter-frequency neighbor list includes one or more absolute radio-frequency channel numbers (ARFCNs) associated with each of first MNC (MNC #1) 102*a*, second MNC (MNC #2) 102*b*, and third MNC (MNC #3) 102*c*, and one or more primary scrambling codes (PSCs) associated with each ARFCN.

In 412, shared small cell management system 110 provisions a static neighbor list based upon the neighbor lists received from each of first MNC 102*a*, second MNC 102*b*, and third MNC 102*c* and sends the static neighbor list to shared small cell 108. In one or more embodiments, the static neighbor list includes a MNC identifier associated with a particular MNC, one or more ARFCN identifiers identifying one or more ARFCNs associated with each MNC, and one or more PSC identifiers identifying one or more PSCs associated with each ARFCN. In a particular embodiments, an MNC identifier may be a public land mobile network (PLMN) identifier including mobile country code (MCC)/mobile network code (MNC). Each PSC entry of the static neighbor list may further include a priority value associated therewith. In a particular illustrated in FIGS. 4A-4I, PSC numbers having a lower value are given a priority greater than PSC numbers having a higher value. For example, PSC #1 has a higher priority than PSC #2. In still other embodiments, each PSC entry of the static neighbor list may include an explicit indication of priority within the static neighbor list. In one or more embodiments, shared small cell management system 110 may send the neighbor list to shared small cell using a message including management object such as described in BBF TR-196v2.

In 414, shared small cell 108 provisions a broadcast neighbor list including the highest priority neighbors only. A particular example of a broadcast neighbor list provisioned by shared small cell 108 is as follows:

MNC#1: ARFCN#1, PSC#1
MNC#2: ARFCN#2, PSC#64
MNC#3: ARFCN#3, PSC#128

In which MNC#1 identifies first MNC 102*a*, ARFCN#1 identifies a particular ARFCN (ARFCN#1) associated with first MNC 102*a*, and PSC#1 identifies a PSC associated with ARFCN#1 having a priority value=1. Similarly, MNC#2 identifies second MNC 102*b*, ARFCN#2 identifies a particular ARFCN (ARFCN#2) associated with second MNC 102*b*, and PSC#64 identifies a PSC associated with ARFCN#2 having a priority value=64. MNC#3 identifies third MNC 102*c*, ARFCN#3 identifies a particular ARFCN (ARFCN#3) associated with third MNC 102*c*, and PSC#128 identifies a PSC associated with ARFCN#3 having a priority value=128. The broadcast neighbor list has a total list size=3. In accordance with various embodiments, shared small cell 108 may periodically broadcast the broadcast neighbor list so that it may be received by any UEs within the coverage area of shared small cell 108.

In 416, first UE (UE #1) 112*a* moves into coverage of shared small cell 108. In 418, first UE 112*a* sends a location update request message to shared small cell 108. In 420, shared small cell 108 sends an identity request message to first UE 112*a* in response to receiving the location update request message. In 422, first UE 112*a* sends an identity response message including the IMSI identifying first UE 112*a* to shard small cell 108 in response to receiving the identity request message. In one or more embodiments, the IMSI identifying first UE 112*a* includes the MNC identifier of first MNC (MNC #1) 102*a*, such as the MCC/MNC of first MNC 102*a*, to which first UE 112*a* is associated. In 424, the location update procedure between first UE 112*a* and shared small cell 108 completes as normal.

In 426, shared small cell 108 matches the IMSI of first UE (UE #1) 112*a* with the static list of neighbors. Since the MNC identifier portion of the IMSI of first UE 112*a* matches the MNC identifier of first MNC (MNC #1) 102*a* within the static neighbor list, in 428 shared small cell 108 re-provisions the broadcast list with the highest priority neighbors plus the entire (or a portion of) static neighbor list of first MNC (MNC #1) 102*a*. A particular example of the broadcast neighbor list re-provisioned by shared small cell 108 is as follows:

MNC#1: ARFCN#1, PSC#1, PSC#2, PSC#3, PSC#4
MNC#1: ARFCN#21, PSC#21, PSC#22, PSC#23, PSC#24
MNC#1: ARFCN#22, PSC#31, PSC#32, PSC#33, PSC#34
MNC#1: ARFCN#22, PSC#35, PSC#36, PSC#37, PSC#38
MNC#2: ARFCN#2, PSC#64
MNC#3: ARFCN#3, PSC#128

The re-provisioned broadcast list has a total list size=18. The re-provisioned broadcast list includes four ARFCNs associated with first MNC (MNC #1) 102*a* with each ARFCN having four PSCs having different associated priorities associated therewith. In accordance with various embodiments, shared small cell 108 may periodically broadcast the re-provisioned broadcast neighbor list so that it may be received by any UEs, such as first UE 112*a*, within the coverage area of shared small cell 108.

In 430, second UE (UE #2) 112*b* moves into coverage of shared small cell 108. In 432, second UE 112*b* sends a location update request message to shared small cell 108. In 434, shared small cell 108 sends an identity request message to second UE 112*b* in response to receiving the location update request message. In 436, second UE 112*b* sends an identity response message including the IMSI identifying second UE 112*b* to shard small cell 108 in response to receiving the identity request message. In one or more embodiments, the IMSI identifying second UE 112*b* includes the MNC identifier of second MNC (MNC #2) 102*b*, such as the MCC/MNC of second MNC 102*b*, to which second UE 112*b* is associated. In 438, the location update procedure between second UE 112*b* and shared small cell 108 completes as normal.

In 440, shared small cell 108 matches the IMSI of second UE (UE #2) 112*b* with the static list of neighbors. Since the MNC identifier portion of the IMSI of second UE 112*b* matches the MNC identifier of second MNC (MNC #2) 102*b* within the static neighbor list, in 442 shared small cell 108 re-provisions the broadcast list with the highest priority neighbors plus the entire (or a portion of) the static neighbor list of second MNC (MNC #2) 102*b*. A particular example of the broadcast neighbor list re-provisioned by shared small cell 108 is as follows:

MNC#1: ARFCN#1, PSC#1, PSC#2, PSC#3, PSC#4
MNC#1: ARFCN#21, PSC#21, PSC#22, PSC#23, PSC#24
MNC#1: ARFCN#22, PSC#31, PSC#32, PSC#33, PSC#34
MNC#1: ARFCN#22, PSC#35, PSC#36, PSC#37, PSC#38
MNC#2: ARFCN#2, PSC#64, PSC#65, PSC#66, PSC#67
MNC#2: ARFCN#2, PSC#68, PSC#69, PSC#70, PSC#71
MNC#2: ARFCN#2, PSC#72, PSC#73, PSC#74, PSC#75
MNC#3: ARFCN#3, PSC#128

The re-provisioned broadcast list has a total list size=29. The re-provisioned broadcast list further includes three ARFCNs associated with second MNC (MNC #2) 10*b* with each ARFCN having four PSCs having different associated priorities associated therewith. In accordance with various embodiments, shared small cell 108 may periodically broadcast the re-provisioned broadcast neighbor list so that it may be received by any UEs, such as first UE 112*a* and second UE 112*b*, within the coverage area of shared small cell 108.

In 444, third UE (UE #3) 112*c* moves into coverage of shared small cell 108. In 446, third UE 112*c* sends a location update request message to shared small cell 108. In 448, shared small cell 108 sends an identity request message to third UE 112*c* in response to receiving the location update request message. In 450, third UE 112*c* sends an identity response message including the IMSI identifying third UE 112*c* to shard small cell 108 in response to receiving the identity request message. In one or more embodiments, the IMSI identifying third UE 112*c* includes the MNC identifier of third MNC (MNC #3) 102*c*, such as the MCC/MNC of third MNC 102*c*, to which third UE 112*c* is associated. In 452, the location update procedure between third UE 112*c* and shared small cell 108 completes as normal.

In 454, shared small cell 108 matches the IMSI of third UE (UE #3) 112*c* with the static list of neighbors. Since the MNC identifier portion of the IMSI of third UE 112*c* matches the MNC identifier of third MNC (MNC #3) 102*c* within the static neighbor list, in 456 shared small cell 108 re-provisions the broadcast list with the highest priority neighbors plus the entire (or a portion of) the static neighbor list of third MNC (MNC #3) 102*c*. A particular example of the broadcast neighbor list re-provisioned by shared small cell 108 is as follows:

MNC#1: ARFCN#1, PSC#1, PSC#2, PSC#3, PSC#4
MNC#1: ARFCN#21, PSC#21, PSC#22, PSC#23, PSC#24
MNC#1: ARFCN#22, PSC#31, PSC#32, PSC#33, PSC#34
MNC#1: ARFCN#22, PSC#35, PSC#36, PSC#37, PSC#38
MNC#2: ARFCN#2, PSC#64, PSC#65, PSC#66, PSC#67
MNC#2: ARFCN#2, PSC#68, PSC#69, PSC#70, PSC#71
MNC#2: ARFCN#2, PSC#72, PSC#73, PSC#74, PSC#75
MNC#3: ARFCN#3, PSC#128, PSC#129, PSC#130, PSC#131
MNC#3: ARFCN#3, PSC#132, PSC#133, PSC#134, PSC#135
MNC#3: ARFCN#4, PSC#128, PSC#129, PSC#130, PSC#131

The re-provisioned broadcast list has a total list size=40. The re-provisioned broadcast list further includes three ARFCNs associated with third MNC (MNC #3) 102*c* with each ARFCN having four PSCs having different associated priorities associated therewith. In accordance with various embodiments, shared small cell 108 may periodically broadcast the re-provisioned broadcast neighbor list so that it may be received by any UEs, such as first UE 112*a* second UE 112*b*, third UE 112*c*, within the coverage area of shared small cell 108.

In 458, shared small cell 108 determines that the list size of 40 exceeds a predetermined value equal to the maximum allowed number of resources that is able to be broadcast from shared small cell 108 and removes the lowest priority neighbors from the broadcast list. In 460, shared small cell 108 re-provisions the broadcast list with the highest priority neighbors with the lowest priority PSCs being removed. A particular example of the broadcast neighbor list re-provisioned by shared small cell 108 is as follows:

MNC#1: ARFCN#1, PSC#1, PSC#2, PSC#3,
MNC#1: ARFCN#21, PSC#21, PSC#22, PSC#23,
MNC#1: ARFCN#22, PSC#31, PSC#32, PSC#33,
MNC#1: ARFCN#22, PSC#35, PSC#36, PSC#37,
MNC#2: ARFCN#2, PSC#64, PSC#65, PSC#66,
MNC#2: ARFCN#2, PSC#68, PSC#69, PSC#70,
MNC#2: ARFCN#2, PSC#72, PSC#73, PSC#74,
MNC#3: ARFCN#3, PSC#128, PSC#129, PSC#130
MNC#3: ARFCN#3, PSC#132, PSC#133, PSC#135
MNC#3: ARFCN#4, PSC#128, PSC#129, PSC#131

The re-provisioned broadcast list has a total list size=30 such that the size of the broadcast neighbor list no longer exceeds the maximum allowed size. The re-provisioned broadcast list further includes four ARFCNs associated with MNC#1 with each ARFCN having three PSCs with the lowest priority PSC of each ARFCN being removed. MNC#2 includes three associated ARFCNs with each ARFCN having three PSCs with the lowest priority PSC of each ARFCN being removed. MNC#3 includes three associated ARFCNs with each ARFCN having three PSCs with the lowest priority PSC of each ARFCN being removed. In accordance with various embodiments, shared small cell 108 may periodically broadcast the re-provisioned broadcast neighbor list so that it may be received by any UEs, such as first UE 112*a* second UE 112*b*, third UE 112*c*, within the coverage area of shared small cell 108.

In 462, first UE (UE #1) 112*a* moves out of coverage from shared small cell 108. In a particular embodiment, first UE 112*a* may move out of coverage and handoff to the RNC associated with first MNC 102*a*. In still other embodiments, first UE 112*a* may handoff to another small cell or RAN. In 464, shared small cell 108 detects first UE (UE #1) 112*a* moving out of coverage. In a particular embodiment, shared small cell 108 may detect first UE moving out of coverage via a timer expiry in which shared small cell 108 has not received a signal from first UE 112*a* by the expiry of a predetermined time period.

In 466, shared small cell 108 reformats the neighbor cell list accounting for first UE 112*a* no longer being within the coverage area of shared small cell 108 by removing the neighbor list entries associated with first MNC 102*a* except for one highest priority neighbors of first MNC 102*a*. In 468, shared small cell 108 re-provisions the broadcast neighbor list including the highest priority neighbors for MNC #2 and MNC #3 but with only the single PSC for MNC #1. A particular example of the broadcast neighbor list re-provisioned by shared small cell 108 is as follows:

MNC#1: ARFCN#1, PSC#1,
MNC#2: ARFCN#2, PSC#64, PSC#65, PSC#66, PSC#67
MNC#2: ARFCN#2, PSC#68, PSC#69, PSC#70, PSC#71
MNC#2: ARFCN#2, PSC#72, PSC#73, PSC#74, PSC#75
MNC#3: ARFCN#3, PSC#128, PSC#129, PSC#130, PSC#131
MNC#3: ARFCN#3, PSC#132, PSC#133, PSC#134, PSC#135
MNC#3: ARFCN#4, PSC#128, PSC#129, PSC#130, PSC#131

The re-provisioned broadcast list has a total list size=25. The re-calculated broadcast list includes one ARFCN associated with MNC#1 having a single PSC associated therewith. MNC#2 includes three associated ARFCNs with each ARFCN having four PSCs. MNC#3 includes three associated ARFCNs with each ARFCN having fourth PSCs. In accordance with various embodiments, shared small cell 108 may periodically broadcast the re-provisioned broadcast neighbor list so that it may be received by any UEs, such as second UE 112*b*, third UE 112*c*, within the coverage area of shared small cell 108.

Figure 5:
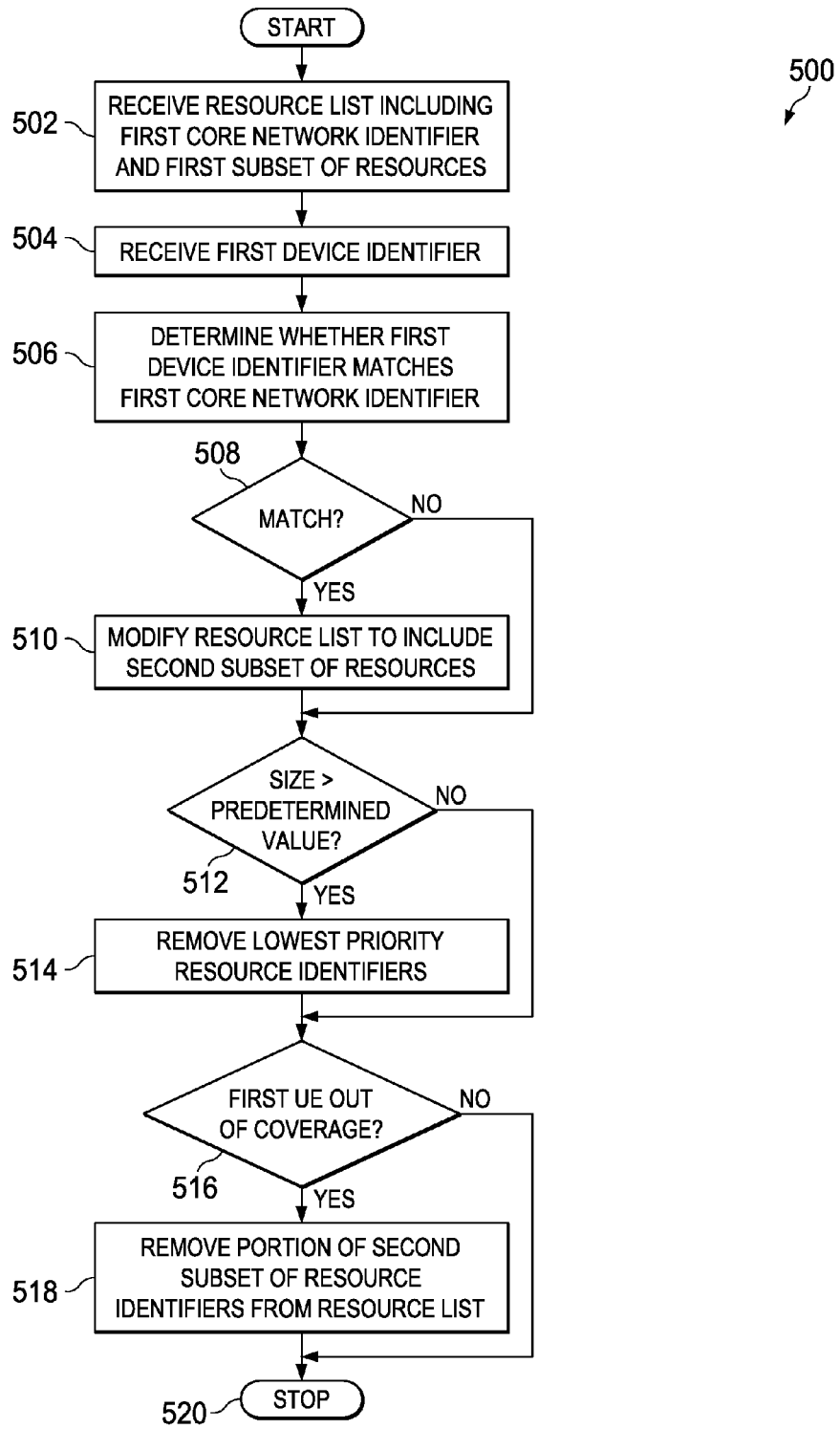
FIG. 5 is a simplified flowchart that illustrates example operations associated with multi-operator network shared small cell deployment in accordance with one embodiment.

Referring now to FIG. 5, FIG. 5 is a simplified flowchart that illustrates example operations 500 associated with multi-operator network shared small cell deployment in accordance with one embodiment. In 502, a first network element receives a resource list. The resource list includes a first core network identifier identifying a first core network, at least a first resource identifier identifying a first subset of network resources from a plurality of network resources associated with the first core network, and a first priority value associated with each of the identified resources of the first core network. In a particular embodiment, the first network element includes a small cell access point. In another particular embodiment, the resource list is an inter-frequency neighbor list. In a particular embodiment, the first core network identifier includes a mobile country code (MCC)/mobile network code (MNC). In a particular embodiment, the plurality of network resources associated with the first core network includes one or more of an absolute radio-frequency channel number (ARFCN) and a primary scrambling code (PSC).

In 504, the first network element receives a first device identifier associated with a first user equipment. In a particular embodiment, the first user equipment is associated with the first core network. In another particular embodiment, the first device identifier includes an international mobile subscriber identity (IMSI) associated with the first user equipment.

In 506, the first network element determines whether a portion of the first device identifier matches the first core network identifier. In 508, when the portion of the first device identifier is determined to match the first core network identifier the operations continue to 510 in which the first network element modifies the resource list to include at least a second resource identifier identifying a second subset of the network resources from the plurality of network resources associated with the first core network and the operations continue to 512. When the portion of the first device identifier is not determined to match the first core network identifier the operations continue to 512. In particular embodiments, the first subset of network resources is greater than the second subset of network resources.

In 512, the first network element determines whether a size of the resource list is greater than a predetermined value. When the size of the broadcast list is greater than the predetermined value, the first network element removes at least one of the second resource identifiers having a lowest first priority value from among the remaining resource identifiers in 514 and the operations continue to 516. When the size of the broadcast list is not greater than the predetermined value, the operations continue to 516.

In 516, the first network element determines whether the first user equipment has moved out of coverage of the first network element. When the first user equipment is determined to have moved out of coverage of the first network element, in 518 the first network element removes a portion of the second resource identifiers identifying the second subset from the resource list and the operations end at 520. When the first user equipment is not determined to have moved out of coverage of the first network element the operations end at 520. In various embodiments, the first network element may be configured to broadcast, e.g. periodically, the resource list to the first user equipment and other user equipment within coverage of the first network element.

It should be understood that in various embodiments, the operations of FIG. 5 may be continuously repeated while first user equipment is within coverage of the first network element. In further embodiments, the operations of FIG. 5 may be repeated when other user equipment associated with other core networks move into coverage of the first network element. For example, in a particular embodiment the resource list may further include a second core network identifier identifying a second core network, at least a second resource identifier identifying a third subset of network resources from a plurality of network resources associated with the second core network, and a second priority value associated with each of the identified resources of the second core network. The first network element may further receive a second device identifier associated with a second user equipment, determining whether a portion of the second device identifier matches the second core network identifier, and modify the resource list to include at least a third resource identifier identifying a fourth subset of the network resources from the plurality of network resources associated with the second core network when the portion of the second device identifier is determined to match the second core network identifier. In a particular embodiment, the second user equipment may be associated with the second core network.

In still other embodiments, a broadcast channel may be a common resource within the network and the resource list may correspond to a defined portion of this common resource. In still other embodiments, a plurality of resource lists may be used in which each resource list includes identification of one or more network resources, and in which each resource list is further associated a different subset of users of a plurality of users.

In regards to the internal structure associated with communication system 100, each of small cell gateway 106, shared small cell 108, and shared small cell management system 110 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to small cell gateway 106, shared small cell 108, and shared small cell management system 110 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 2 and 3] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 2 and 3] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network;
   receiving a first device identifier associated with a first user equipment;
   determining whether a portion of the first device identifier matches the first core network identifier;
   modifying the resource list to include at least a second resource identifier identifying a second subset of the network resources from the plurality of network resources associated with the first core network when the portion of the first device identifier is determined to match the first core network identifier, wherein the resource list further includes a second core network identifier identifying a second core network, at least a third resource identifier identifying a third subset of network resources from a plurality of network resources associated with the second core network, and a second priority value associated with each of the identified resources of the second core network;
   receiving a second device identifier associated with a second user equipment; and
   determining whether a portion of the second device identifier matches the second core network identifier.

2. The method of claim 1, further comprising:
   determining whether a size of the resource list is greater than a predetermined value; and
   removing at least one of the second resource identifiers having a lowest first priority value from among the remaining resource identifiers when the size of the resource list is greater than the predetermined value.

3. The method of claim 1, further comprising:
   determining whether the first user equipment has moved out of coverage of the first network element; and
   removing a portion of the second resource identifiers identifying the second subset from the resource list when the first user equipment is determined to have moved out of coverage of the first network element.

4. The method of claim 1, further comprising broadcasting the resource list to the first user equipment.

5. The method of claim 1, wherein the first user equipment is associated with the first core network.

6. The method of claim 1, further comprising:
modifying the resource list to include at least a fourth resource identifier identifying a fourth subset of the network resources from the plurality of network resources associated with the second core network when the portion of the second device identifier is determined to match the second core network identifier.

7. The method of claim 6, wherein the second user equipment is associated with the second core network.

8. The method of claim 1, wherein the resource list is an inter-frequency neighbor list.

9. The method of claim 1, wherein the first core network identifier includes a mobile country code (MCC)/mobile network code (MNC).

10. The method of claim 1, wherein the plurality of network resources associated with the first core network includes one or more of an absolute radio-frequency channel number (ARFCN) and a primary scrambling code (PSC).

11. The method of claim 1, wherein the first device identifier includes an international mobile subscriber identity (IMSI) associated with the first user equipment.

12. The method of claim 1, wherein the first subset of network resources is greater than the second subset of network resources.

13. The method of claim 1, wherein the first network element includes a small cell access point.

14. Logic encoded in one or more non-transitory media that includes code for execution and when executed by a processor operable to perform operations comprising:
receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network;
receiving a first device identifier associated with a first user equipment;
determining whether a portion of the first device identifier matches the first core network identifier;
modifying the resource list to include at least a second resource identifier identifying a second subset of the network resources from the plurality of network resources associated with the first core network when the portion of the first device identifier is determined to match the first core network identifier, wherein the resource list further includes a second core network identifier identifying a second core network, at least a third resource identifier identifying a third subset of network resources from a plurality of network resources associated with the second core network, and a second priority value associated with each of the identified resources of the second core network;
receiving a second device identifier associated with a second user equipment; and
determining whether a portion of the second device identifier matches the second core network identifier.

15. The logic of claim 14, wherein the operations further comprise:
determining whether a size of the resource list is greater than a predetermined value; and
removing at least one of the second resource identifiers having a lowest first priority value from among the remaining resource identifiers when the size of the resource list is greater than the predetermined value.

16. The logic of claim 14, wherein the operations further comprise:
determining whether the first user equipment has moved out of coverage of the first network element; and
removing a portion of the second resource identifiers identifying the second subset from the resource list when the first user equipment is determined to have moved out of coverage of the first network element.

17. The logic of claim 14, wherein the operations further include broadcasting the resource list to the first user equipment.

18. The logic of claim 14, wherein the operations further comprise:
modifying the resource list to include at least a fourth resource identifier identifying a fourth subset of the network resources from the plurality of network resources associated with the second core network when the portion of the second device identifier is determined to match the second core network identifier.

19. The logic of claim 14, wherein the resource list is an inter-frequency neighbor list.

20. A network element, comprising:
a memory element configured to store electronic code;
a processor operable to execute instructions associated with the electronic code; and
a module coupled to the memory element and the processor, wherein the network element is configured for:
receiving a resource list at a first network element, the resource list including a first core network identifier identifying a first core network, at least a first resource identifier identifying a first subset of network resources from a plurality of network resources associated with the first core network, and a first priority value associated with each of the identified resources of the first core network;
receiving a first device identifier associated with a first user equipment;
determining whether a portion of the first device identifier matches the first core network identifier;
modifying the resource list to include at least a second resource identifier identifying a second subset of the network resources from the plurality of network resources associated with the first core network when the portion of the first device identifier is determined to match the first core network identifier, wherein the resource list further includes a second core network identifier identifying a second core network, at least a third resource identifier identifying a third subset of network resources from a plurality of network resources associated with the second core network, and a second priority value associated with each of the identified resources of the second core network;
receiving a second device identifier associated with a second user equipment; and
determining whether a portion of the second device identifier matches the second core network identifier.

21. The network element of claim 20, wherein the network element is further configured to:
determine whether a size of the resource list is greater than a predetermined value; and
remove at least one of the second resource identifiers having a lowest first priority value from among the remaining resource identifiers when the size of the resource list is greater than the predetermined value.

22. The network element of claim 20, wherein the network element is further configured to:

determine whether the first user equipment has moved out of coverage of the first network element; and remove a portion of the second resource identifiers identifying the second subset from the resource list when the first user equipment is determined to have moved out of coverage of the first network element.

23. The network element of claim 20, wherein the network element is further configured to broadcast the resource list to the first user equipment.

24. The network element of claim 20, wherein the network element is further configured to:

modify the resource list to include at least a fourth resource identifier identifying a fourth subset of the network resources from the plurality of network resources associated with the second core network when the portion of the second device identifier is determined to match the second core network identifier.

25. The network element of claim 20, wherein the resource list is an inter-frequency neighbor list.

\* \* \* \* \*